J. & W. L. HERVEY.
COTTON PICKING MACHINE.
APPLICATION FILED JUNE 23, 1906.
907,691.
Patented Dec. 22, 1908.
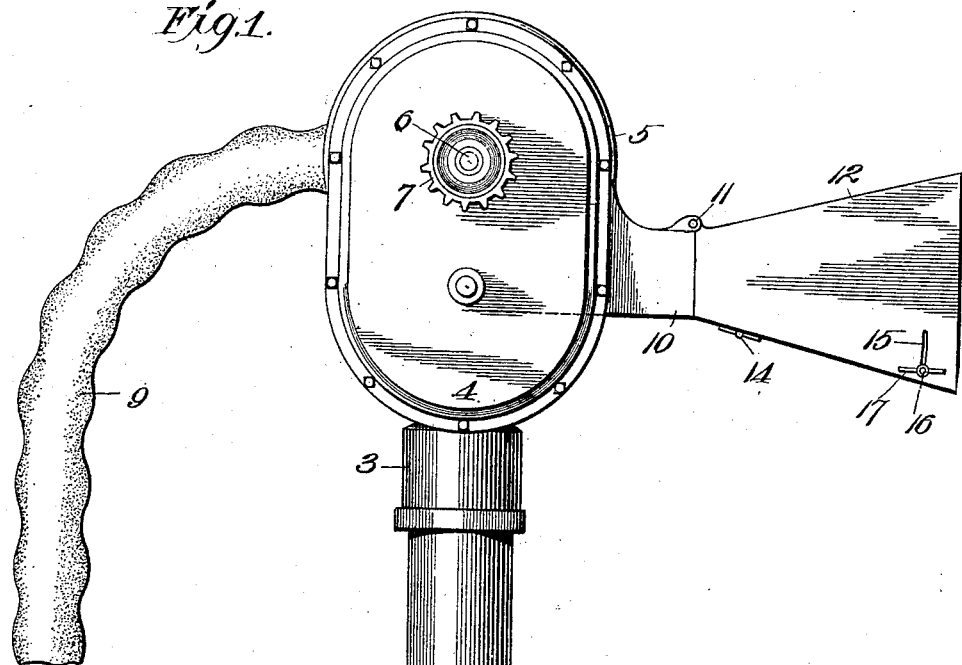
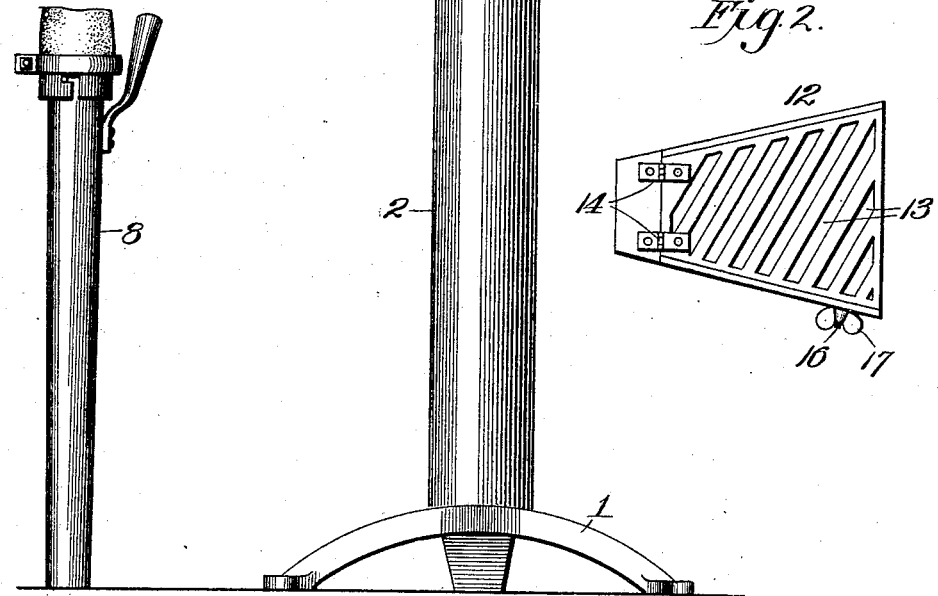
Witnesses:
Frank R. Glen
H. C. Rodgers
Inventors:
John Hervey and W. L. Hervey,
By George Y. Thorpe, Atty.

UNITED STATES PATENT OFFICE.

JOHN HERVEY, OF KANSAS CITY, MISSOURI, AND WILLIAM L. HERVEY, OF POARCH, OKLAHOMA, ASSIGNORS TO THE KING COTTON PICKER CO., OF KANSAS CITY, MISSOURI, A CORPORATION OF MISSOURI.

COTTON-PICKING MACHINE.

No. 907,691.     Specification of Letters Patent.     Patented Dec. 22, 1908.

Application filed June 23, 1906. Serial No. 323,161.

*To all whom it may concern:*

Be it known that we, JOHN HERVEY and WILLIAM L. HERVEY, citizens of the United States, residing, respectively, at Kansas City, Jackson county, in the State of Missouri, and Poarch, Roger Mills county, Oklahoma, have invented certain new and useful Improvements in Cotton-Picking Machines, of which the following is a specification.

This invention relates to cotton picking machines, and our object is to produce a machine of this character which operates efficiently and reliably.

A further object is to produce a machine of this character which can be operated at a minimum expenditure of power and by which a separation is effected between the cotton and the twigs and leaves and sand or earth clinging to the cotton when picked.

With these general objects in view and others as hereinafter appear, the invention consists in certain novel and peculiar features of construction and organization as hereinafter described and claimed; and in order that it may be fully understood reference is to be had to the accompanying drawings, in which—

Figure 1, is a side view of a cotton picking machine embodying our invention. Fig. 2, is a detail bottom plan view of the delivery spout of the machine.

In the said drawing, 1 indicates a suitable base adapted to be secured on a wagon or other support, not shown, to travel through a cotton field. 2 indicates a standard mounted on the base and 3 is a cap swiveled on the standard and forming a support for the gear casing 4, and the fan-casing 5, the fan, not shown, within said casing being adapted to be driven through any suitable gearing, not shown, from the drive shaft 6 journaled in the fan casing and equipped at its outer end with a sprocket wheel 7, to which motion is adapted to be imparted by a chain, not shown.

8 is a suction tube connected by a flexible tube 9 with the fan-casing in order to utilize the suction created by the fan when driven at a high rate of speed, to draw the cotton from the plants up through the suction tube and the flexible tube into the fan-casing, which is provided with a peripheral discharge spout 10.

Hinged as at 11 to spout 10 is an outwardly extending spout-extension 12 which by gravity abuts at its rear or smaller end against the front end of spout 10. The major portion of the bottom of the spout extension 12 is foraminous, being shown as slotted at 13 and hinged at 14 to the non-slotted part of the bottom, and projecting from one end of the slotted portion through a slot 15 in the adjacent side wall, is a pin 16, engaged at its outer end by a nut 17, the nut shown being in the form of a wing-nut. When the nut is unscrewed slightly the slotted portion of the bottom can be swung vertically to vary the cross-sectional area of the spout extension, the reverse manipulation of the nut causing it to clamp the said slotted portion at the desired point of adjustment.

The slotted portion above described is for the purpose of permitting sand and other heavy foreign matter separated from the cotton in the passage of the latter through the machine, to fall through said foraminous or slotted bottom.

The expanding form of the spout-extension permits the cotton as it is forced therethrough to become sufficiently loosened or separated from the sand and other heavy foreign matter to insure its discharge practically free from such matter, the force of the expulsion of course projecting twigs or leaves which may be mixed with the cotton, a greater distance than the sand or heavy matter. The cotton being of the least specific gravity, will be projected the greatest distance from the spout-extension so that it shall fall comparatively clean, into the desired receptacle, such for instance as the box or body of the wagon upon which the machine may be mounted.

If it be desired to project the cotton a greater or less distance, the hinged bottom of the spout-extension will be raised to contract or lowered to expand the cross sectional area of the spout-extension, as will be readily understood.

From the above description it will be apparent that we have produced a machine by which cotton can be picked efficiently and rapidly and which involves the least possible labor on the part of the cotton picker or person who walks by the machine and handles the receiving tube, and we wish it to be understood that we do not desire to be restricted to the exact details of construction shown as various modifications will suggest themselves to one skilled in the art.

Having thus described the invention what we claim as new and desire to secure by Letters Patent is:—

1. In a cotton picking machine, a fan casing having a receiving opening, and a discharge spout at its periphery provided with an extension increasing in cross sectional area toward its outer or discharge end, and having the bottom of the extension of foraminous construction.

2. In a cotton picking machine, a fan casing having a receiving opening and a discharge spout at its periphery provided with an extension increasing in cross sectional area toward its outer or discharge end, and having an adjustable bottom to vary its cross sectional area.

In testimony whereof we affix our signatures, in the presence of two witnesses.

JOHN HERVEY.
WILLIAM L. HERVEY.

Witnesses for John Hervey:
G. Y. Thorpe,
H. C. Rodgers.

Witnesses for Wm. L. Hervey:
Ben. Jones,
U. N. Waldrop.